(12) United States Patent
Wu

(10) Patent No.: US 8,031,600 B2
(45) Date of Patent: Oct. 4, 2011

(54) METHOD AND RELATED APPARATUS FOR PERFORMING STATUS REPORT PROCEDURE IN A WIRELESS COMMUNICATION SYSTEM

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 798 days.

(21) Appl. No.: 12/123,466

(22) Filed: May 20, 2008

(65) Prior Publication Data

US 2009/0291679 A1  Nov. 26, 2009

(51) Int. Cl.
*H04L 12/24* (2006.01)
*H04J 1/16* (2006.01)
*H04J 3/14* (2006.01)

(52) U.S. Cl. ......... 370/231; 370/346; 370/469; 370/474
(58) Field of Classification Search .................. 370/252, 370/310–350, 469–476
See application file for complete search history.

(56) References Cited

U.S. PATENT DOCUMENTS

| | | | | |
|---|---|---|---|---|
| 7,616,639 | B2 * | 11/2009 | Lee et al. ...................... | 370/394 |
| 2006/0251105 | A1 * | 11/2006 | Kim et al. ...................... | 370/449 |
| 2008/0212561 | A1 * | 9/2008 | Pani et al. ...................... | 370/346 |
| 2008/0294958 | A1 * | 11/2008 | Lee et al. ...................... | 714/748 |
| 2010/0254340 | A1 * | 10/2010 | Park et al. ...................... | 370/329 |
| 2011/0090793 | A1 * | 4/2011 | Halfmann et al. ............ | 370/235 |

FOREIGN PATENT DOCUMENTS

| | | |
|---|---|---|
| EP | 2026523 A1 | 2/2009 |
| WO | 2006104344 A2 | 10/2006 |

OTHER PUBLICATIONS

3GPP TS 25.321 V7.5.0 (Jun. 2007) Technical Specification Group Radio Access Network; Medium Access Control (MAC) protocol specification (Release 7).
3GPP TS 25.322 V7.3.0 (Jun. 2007) Technical Specification Group Radio Access Network; Radio Link Control (RLC) protocol specification (Release 7).
3GPP TS 25.322 V8.1.0 (Mar. 2008), 3rd Generation Partnership Project; Technical Specification Group Radio Access Network; Radio Link Control (RLC) protocol specification (Release 8), front page plus pp. 2-89, XP002582646, Sophia Antipolis Valbonne—France.
Office action mailed on Jul. 13, 2011 for the European application No. 08019634.8, filing date Nov. 10, 2008, pp. 1-5.
Ericsson, Nokia, Siemens, "L2 Enhancements", 3GPP TSG-RAN WG2#56bis, Tdoc R2-070036, Jan. 15-19, 2007, Sorrento, Italy, XP050133150, pp. 1-4.

* cited by examiner

*Primary Examiner* — Tri H Phan
(74) *Attorney, Agent, or Firm* — Winston Hsu; Scott Margo

(57) ABSTRACT

A method for performing a status report procedure in a receiver of a wireless communication system includes forming a STATUS PDU in an RLC layer, forming a Data PDU with a flexible size when a mode of flexible RLC PDU size is configured, combining the Data PDU with the STATUS PDU for forming a concatenated RLC PDU for a MAC layer, forming a MAC PDU for carrying the concatenated RLC PDU, and transmitting the MAC PDU to a peer transmitter.

26 Claims, 10 Drawing Sheets

METHOD AND RELATED APPARATUS FOR PERFORMING STATUS REPORT PROCEDURE IN A WIRELESS COMMUNICATION SYSTEM

BACKGROUND OF THE INVENTION

1. Field of the Invention

The present invention relates to a method and related apparatus for performing status report procedure in a wireless communication system, and more particularly, to a method and apparatus for performing status report procedure in a wireless communication system when flexible PDU size is configured, so as to reduce system overhead.

2. Description of the Prior Art

The third generation (3G) mobile telecommunication system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates.

The access stratum of the 3G mobile telecommunication system comprises a radio resource control (RRC), radio link control (RLC), media access control (MAC), packet data convergence protocol (PDCP), broadcast/multicast control (BMC) and other sub-layers of different functions. The operations of the above-mentioned sub-layers are well known for those skilled in the art, and will not be further mentioned. A primary function of the RLC layer is providing different transmission quality processing, performing segmentation, reassembly, concatenation, padding, retransmission, sequence check, and duplication detection on received data or control instructions based on different transmission quality requirements. The MAC layer can match packets received from different logic channels of the RLC layer to common, shared, or dedicated transport channels according to radio resource allocation commands of the RRC layer, for performing channel mapping, multiplexing, transport format selection, or random access control.

In the RLC layer, the purpose of "padding" is to make lengths of all Protocol Data Units (PDUs) outputted from an RLC entity to be the same. That is, after the RLC entity receives a Service Data Unit (SDU) from the upper layer, if the length of the SDU is smaller than a maximum PDU payload size, the RLC entity will pad out the SDU with meaningless data, so as to form a PDU in conformation with a predefined length. Otherwise, if the length of the SDU is greater than the maximum PDU payload size, the RLC entity will segment the SDU with the maximum PDU payload size. After the segmentation, if the length of the last segment is smaller than the maximum PDU payload size, the RLC entity will pad out the last segment with meaningless data, to form a PDU in conformation with the predefined length.

In the prior art, "padding" can make the lengths of the RLC PDUs to be identical to each other. However, the prior art "padding" decreases bandwidth utility rate and data processing efficiency, especially for high data rate applications, such as High Speed Downlink Package Access (HSDPA) and High Speed Uplink Package Access (HSUPA) in the 3G mobile telecommunication system. In such a situation, a scheme of flexible RLC PDU size is proposed to eliminate padding, to enhance bandwidth utility rate and data processing efficiency, and to improve uplink and downlink (UL/DL) transmission rate.

For example, please refer to FIG. 1, which illustrates a schematic diagram of an application of the flexible RLC PDU size according to the prior art. In FIG. 1, SDU_1 and SDU_2 represent SDUs from the upper layer, PDU_1~PDU_3 represent RLC PDUs, oblique-line parts in front of PDU_1~PDU_3 represent PDU headers, and MPZ represents the maximum PDU payload size. As shown in FIG. 1, the total length of SDU_1 and SDU_2 is greater than two times MPZ, but smaller than three times MPZ. Therefore, the prior art uses a segmentation method to carry SDU_1 and SDU_2 with PDU_1~PDU_3. The segmentation method is: if the length of one or concatenated SDUs is greater than one or multiple times of MPZ, the RLC entity will segment the SDU with a unit of MPZ until a last segment or SDU smaller than MPZ is left, and carry the last segment or SDU with a flexible-size RLC PDU. In other words, the lengths of PDU_1 and PDU_2 are equal to the maximum PDU size, while the length of PDU_3 is smaller than the maximum PDU size.

To support the flexible RLC PDU size feature, a segmentation function is added in the MAC layer. According to what is specified in related RLC and MAC specifications, a disadvantage, which makes radio resource usage inefficient, can be found as follows.

Firstly, a concept of Piggybacked STATUS PDU is to fully utilize the radio resources by using the padding part in an RLC AMD (Acknowledgement Mode Data) PDU. However, an AMD PDU with flexible RLC PDU size has no padding. In this case, there is no piggybacked STATUS PDU used when the flexible RLC PDU size is configured. However, lossless reconfiguration from fixed to flexible RLC PDU size is introduced recently. If an AMD PDU with fixed RLC PDU size including a piggybacked STATUS PDU is ongoing during reconfiguration, the receiver can receive this AMD PDU after changing to the flexible RLC PDU size and discard it if the receiver interprets it as an invalid PDU format.

Secondly, from the function point of view in the RLC layer, a STATUS PDU piggybacked or not does not have any impact. However, when RLC/MAC is considered together, such as in a Long Term Evolution (LTE) system, overhead occurs if the STATUS PDU is not piggybacked. For example, please refer to FIG. 2, which illustrates a schematic diagram of transmission of an RLC AMD PDU and an RLC STATUS PDU according to the prior art. After receiving an RLC SDU and SUFIs (Super Fields) from the upper layer, the RLC layer adds corresponding RLC headers to form the RLC AMD PDU and the RLC STATUS PDU. Then, the MAC-d (dedicated) layer forms MAC-d PDUs, or MAC-ehs SDUs, for the MAC-ehs layer, so as to form MAC-ehs PDU after adding a MAC-ehs header. As shown in FIG. 2, since no piggybacked STATUS PDU can be used due to flexible RLC PDU size, the STATUS PDU cannot be piggybacked by the RLC AMD PDU. As a result, two sets of parameters, including LCH-ID, L, TSN, SI, and F, in the MAC-ehs header are required, and thus overhead occurs. Note that, meanings of the parameters LCH-ID, L, TSN, SI, and F can be found in related specifications, and will not be narrated in detail for clarity.

Therefore, when flexible RLC PDU size is configured, an AMD PDU with flexible RLC PDU size has no padding. In such a situation, the RLC STATUS PDU cannot be piggybacked by the AMD PDU, and overhead occurs.

SUMMARY OF THE INVENTION

According to the present invention, a method for performing a status report procedure in a receiver of a wireless communication system comprises forming a STATUS PDU in an RLC layer, forming a Data PDU with a flexible size when a mode of flexible RLC PDU size is configured, combining the Data PDU with the STATUS PDU for forming a concatenated RLC PDU for a MAC layer, forming a MAC PDU for carrying the concatenated RLC PDU, and transmitting the MAC PDU to a peer transmitter.

According to the present invention, a communication device of a wireless communication system utilized for performing a status report procedure comprises a control circuit for realizing functions of the communication device, a processor installed in the control circuit for executing a program code to operate the control circuit, and a memory coupled to the processor for storing the program code. The program code comprises forming a STATUS PDU in an RLC layer, forming a Data PDU with a flexible size when a mode of flexible RLC PDU size is configured, combining the Data PDU with the STATUS PDU for forming a concatenated RLC PDU for a MAC layer, forming a MAC PDU for carrying the concatenated RLC PDU, and transmitting the MAC PDU to a peer transmitter.

According to the present invention, a method for performing a status report procedure in a transmitter of a wireless communication system comprises receiving a MAC PDU carrying a concatenated RLC PDU formed by a STATUS PDU and a Data PDU with a flexible size from a receiver, which has configured a mode of flexible RLC PDU size, extracting the STATUS PDU and the Data PDU, and determining a status of the receiver according to the STATUS PDU.

According to the present invention, a communication device of a wireless communication system utilized for performing a status report procedure comprises a control circuit for realizing functions of the communication device, a processor installed in the control circuit for executing a program code to operate the control circuit, and a memory coupled to the processor for storing the program code. The program code comprises receiving a MAC PDU carrying a concatenated RLC PDU formed by a STATUS PDU and a Data PDU with a flexible size from a receiver, which has configured a mode of flexible RLC PDU size, extracting the STATUS PDU and the Data PDU, and determining a status of the receiver according to the STATUS PDU.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
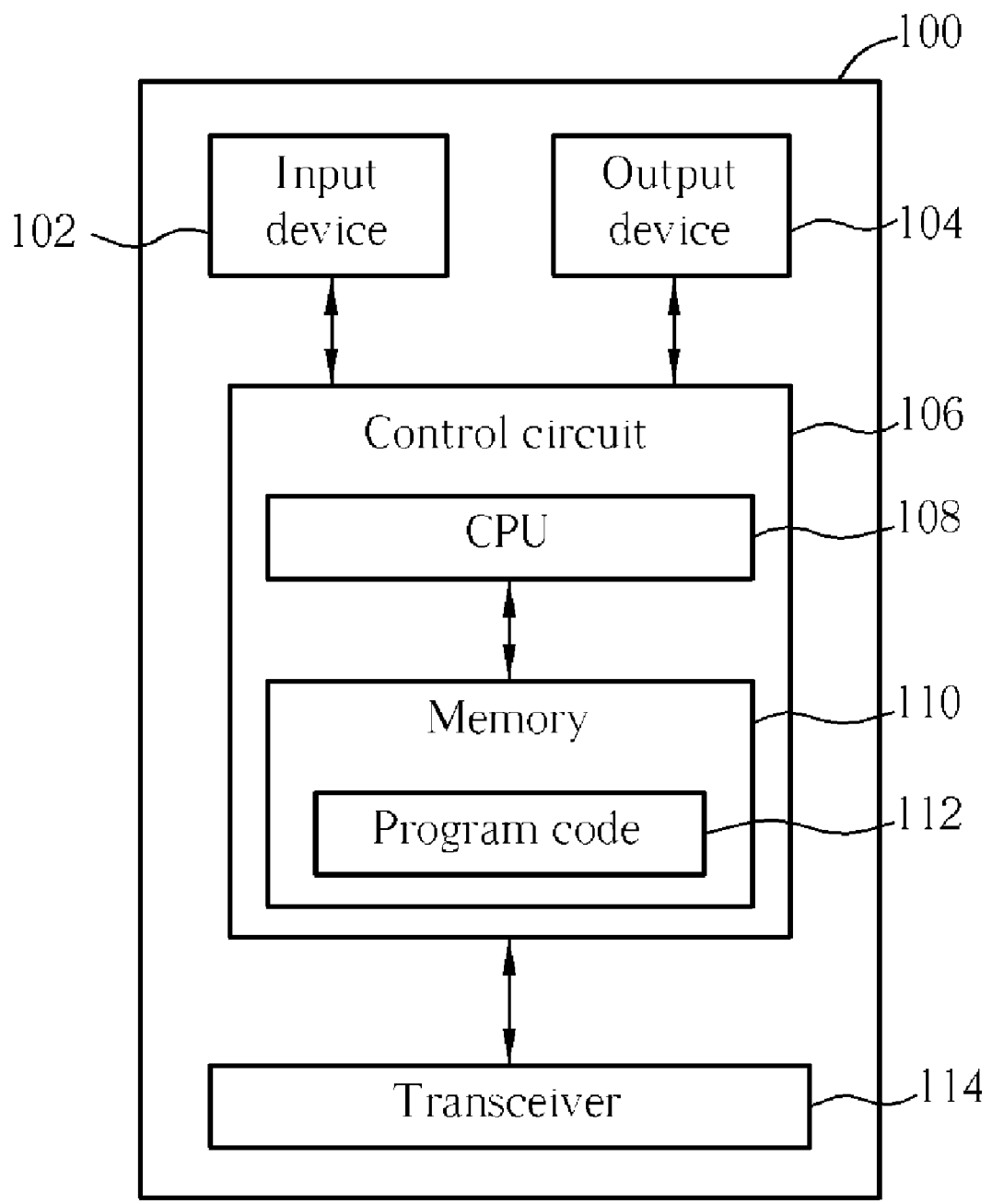
FIG. 3 illustrates a function block diagram of a wireless communication device.

Please refer to FIG. 3, which is a functional block diagram of a communication device 100. For the sake of brevity, FIG. 3 only shows an input device 102, an output device 104, a control circuit 106, a central processing unit (CPU) 108, a memory 110, a program code 112, and a transceiver 114 of the communication device 100. In the communication device 100, the control circuit 106 executes the program code 112 in the memory 110 through the CPU 108, thereby controlling an operation of the communication device 100. The communication device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communication protocol framework, the transceiver 114 can be seen as a portion of Layer 1, RF and antenna, and the control circuit 106 can be utilized to realize functions of Layer 2 and Layer 3. Preferably, the communication device 100 is utilized in a third generation (3G) mobile communication system.

Figure 4:
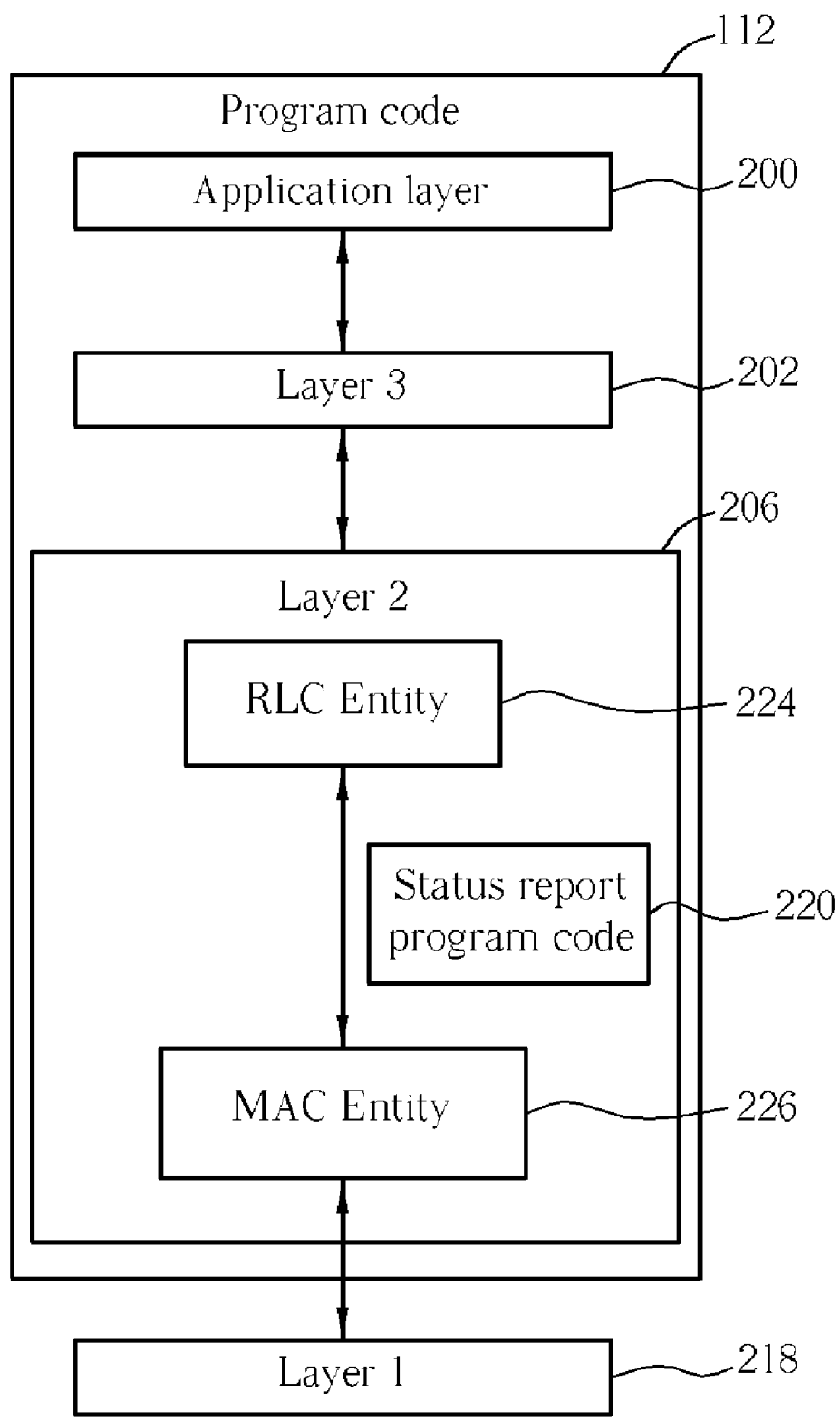
FIG. 4 illustrates a diagram of program code of FIG. 3.

Please continue to refer to FIG. 4. FIG. 4 is a diagram of the program code 112 shown in FIG. 3. The program code 112 includes an application layer 200, a Layer 3 202, and a Layer 2 206, and is coupled to a Layer 1 218. The Layer 2 206 comprises two sub-layers: a radio link control (RLC) entity 224 and a media access control (MAC) entity 226. A primary function of the RLC entity 224 is providing different transmission quality processing, performing segmentation, reassembly, concatenation, padding, retransmission, sequence check, and duplication detection on received data or control instructions based on different transmission quality requirements. The MAC entity 226 can match packets received from different logic channels of the RLC entity 224 to common, shared, or dedicated transport channels according to radio resource allocation commands of the Layer 3 (RRC layer) 202, for performing channel mapping, multiplexing, transport format selection, or random access control.

Targeting at high data rate applications, such as HSDPA and HSUPA in the 3G mobile communications system, the RLC entity 224 can use flexible-size RLC PDU to eliminate "padding", and enhance bandwidth utility rate, data processing efficiency, and UL/DL transmission rate. In such a situation, the present invention provides a status report program code 220 in the Layer 2 206, for accurately performing a status report procedure.

Figure 5:
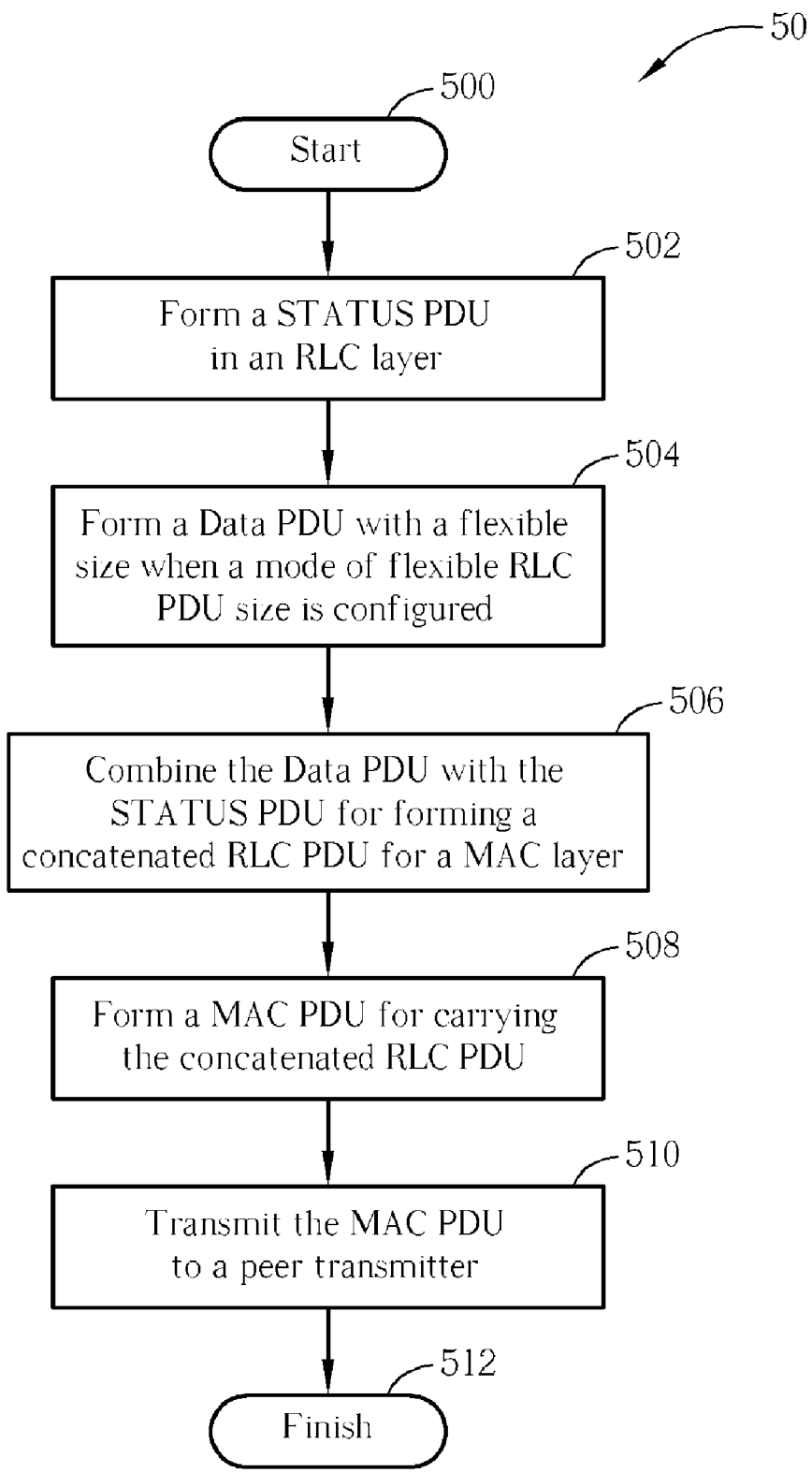
FIG. 5 and FIG. 6 illustrate flowcharts of processes according to the present invention.

Please refer to FIG. 5, which illustrates a schematic diagram of a process 50. The process 50 is utilized for performing a status report procedure in a receiver of a wireless communication system, and can be compiled in the status report program code 220. The process 50 comprises the following steps:

Step 500: Start.
Step 502: Form a STATUS PDU in an RLC layer.
Step 504: Form a Data PDU with a flexible size when a mode of flexible RLC PDU size is configured.
Step 506: Combine the Data PDU with the STATUS PDU for forming a concatenated RLC PDU for a MAC layer.
Step 508: Form a MAC PDU for carrying the concatenated RLC PDU.
Step 510: Transmit the MAC PDU to a peer transmitter.
Step 512: Finish.

According to the process 50, in the receiver, the present invention can combine a Data PDU with a STATUS PDU to form a concatenated RLC PDU when flexible PDU size is configured. In other words, the present invention can use a piggybacked STATUS PDU when flexible PDU size is configured, so that the header of the MAC PDU carrying the concatenated RLC PDU can only comprise fields for indicating parameters, such as LCH-ID, L, TSN, SI, and F, of the concatenated RLC PDU.

Figure 6:
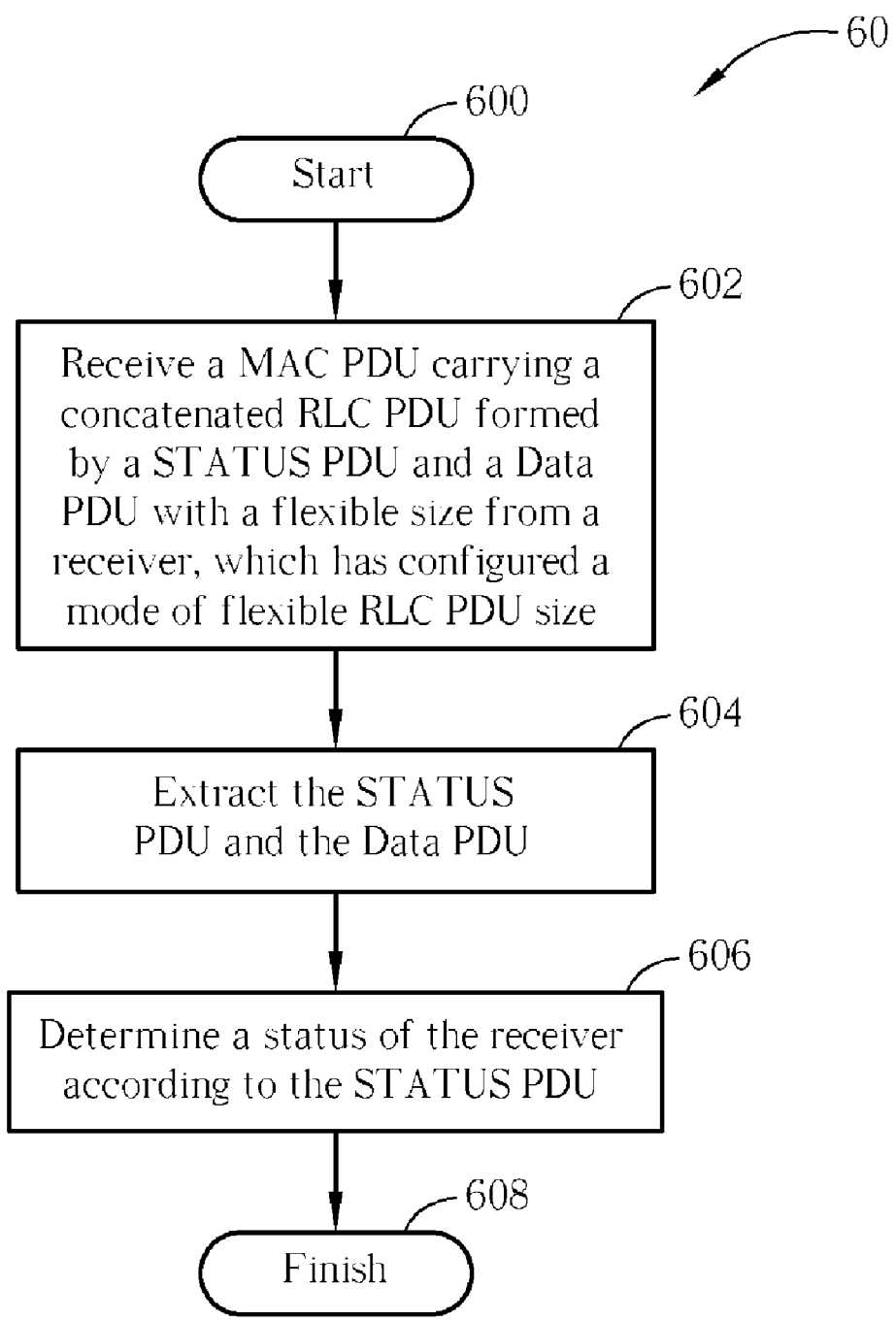

To receive the piggybacked STATUS PDU when flexible PDU size is configured, the present invention further provides a process 60 shown in FIG. 6 for performing the status report procedure in a transmitter of a wireless communication system. The process 60 can also be compiled in the status report program code 220, and comprises the following steps:

Step 600: Start.

Step 602: Receive a MAC PDU carrying a concatenated RLC PDU formed by a STATUS PDU and a Data PDU with a flexible size from a receiver, which has configured a mode of flexible RLC PDU size.

Step 604: Extract the STATUS PDU and the Data PDU.

Step 606: Determine a status of the receiver according to the STATUS PDU.

Step 608: Finish.

According to the process 60, in the transmitter, the present invention can determine a status of the receiver according to the STATUS PDU, which is piggybacked to the Data PDU with a flexible PDU size. That is, the present invention can accurately determine the status of the receiver according to the piggybacked STATUS PDU when flexible PDU size is configured. In such as a situation, the header of the MAC PDU carrying the concatenated RLC PDU can only comprise fields for indicating parameters, such as LCH-ID, L, TSN, SI, and F, of the concatenated RLC PDU.

Via the processes 50 and 60, the present invention can accurately perform the status report procedure in the receiver and the transmitter when flexible PDU size is configured. Note that, the processes 50 and 60 are embodiment of the present invention, and those skilled in the art can make modifications accordingly.

Figure 1:
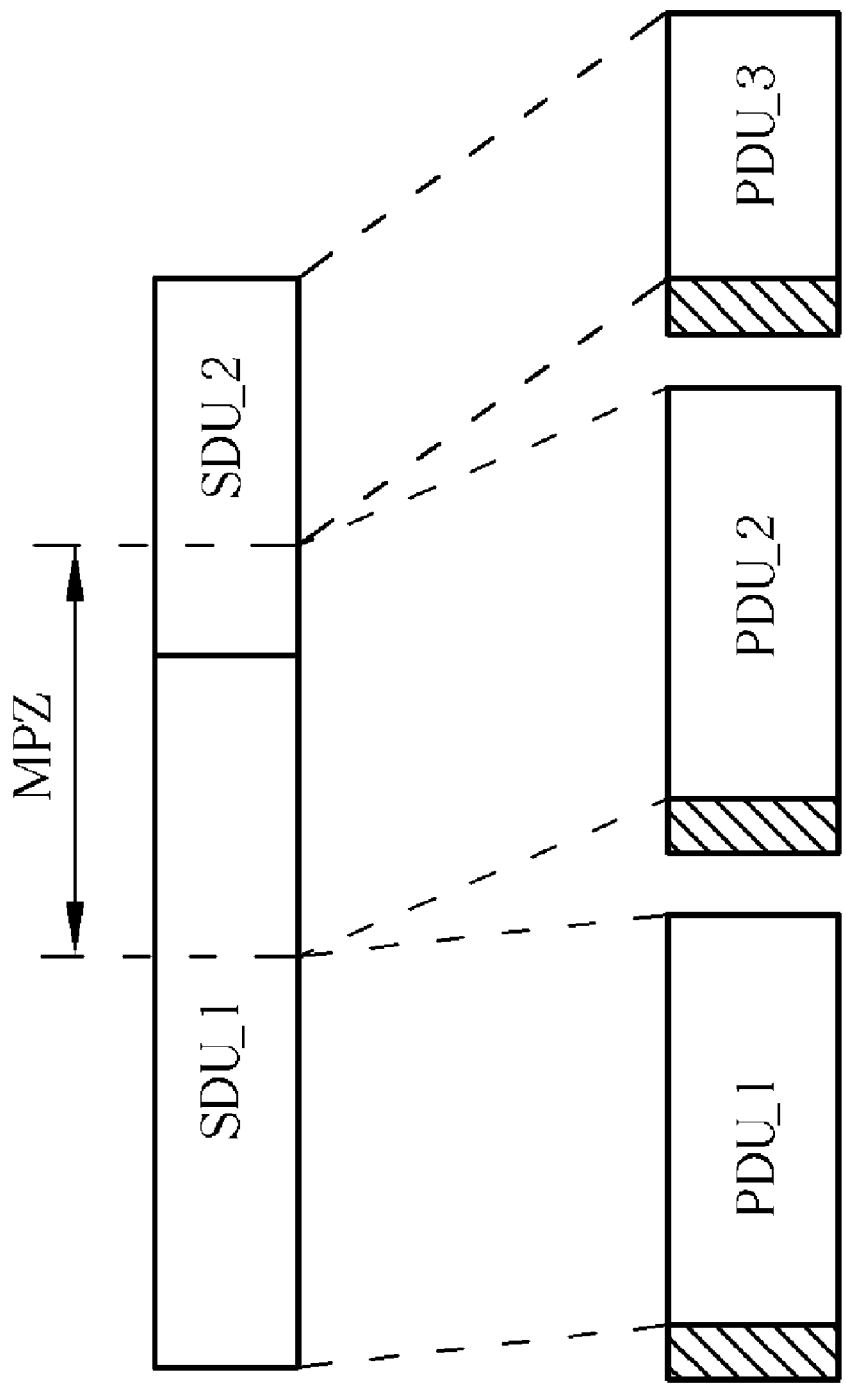
FIG. 1 illustrates a schematic diagram of an application of the flexible RLC PDU size according to the prior art.
Figure 2:
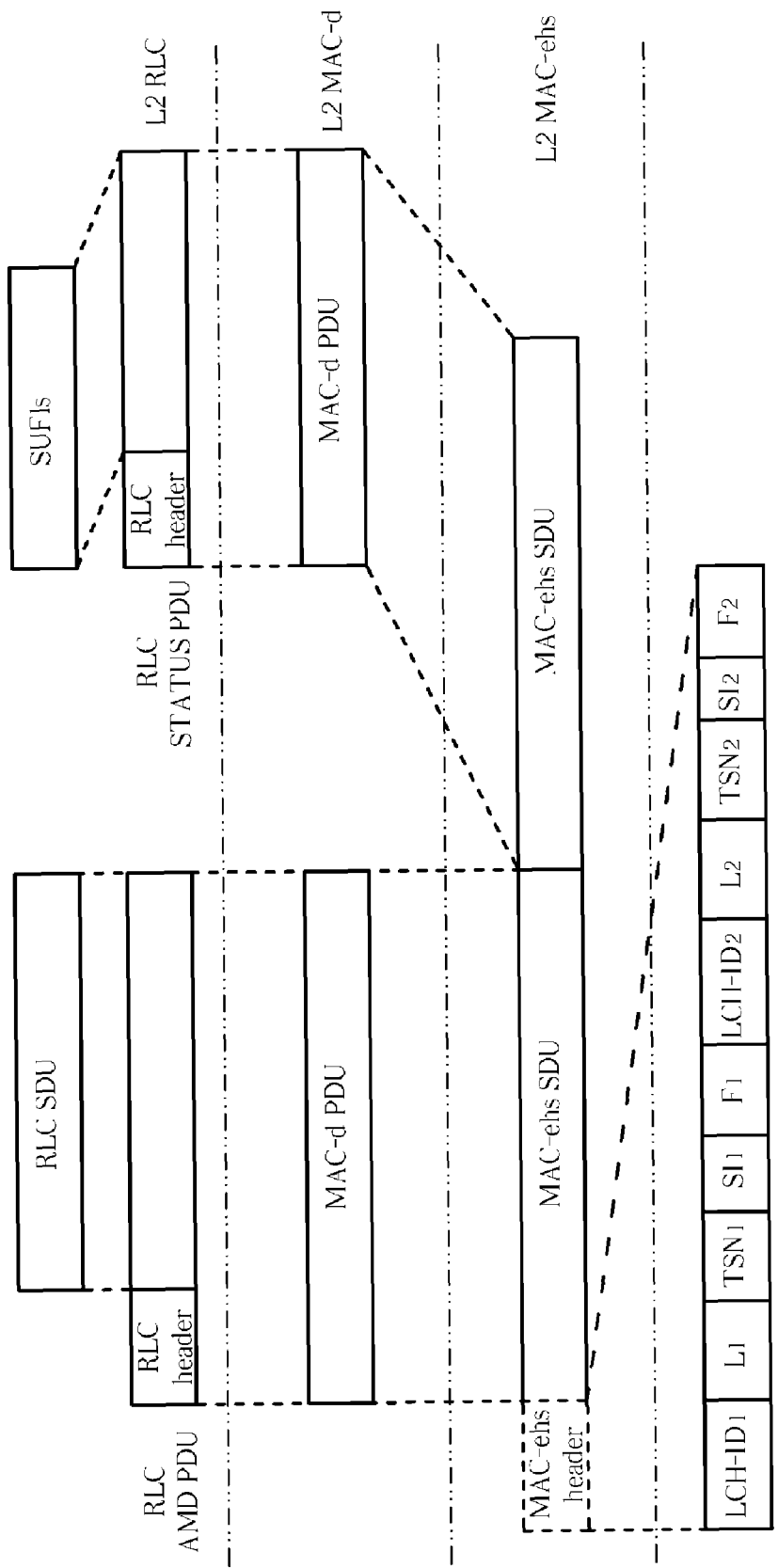
FIG. 2 illustrates a schematic diagram of transmission of an RLC AMD PDU and an RLC STATUS PDU according to the prior art.
Figure 7:
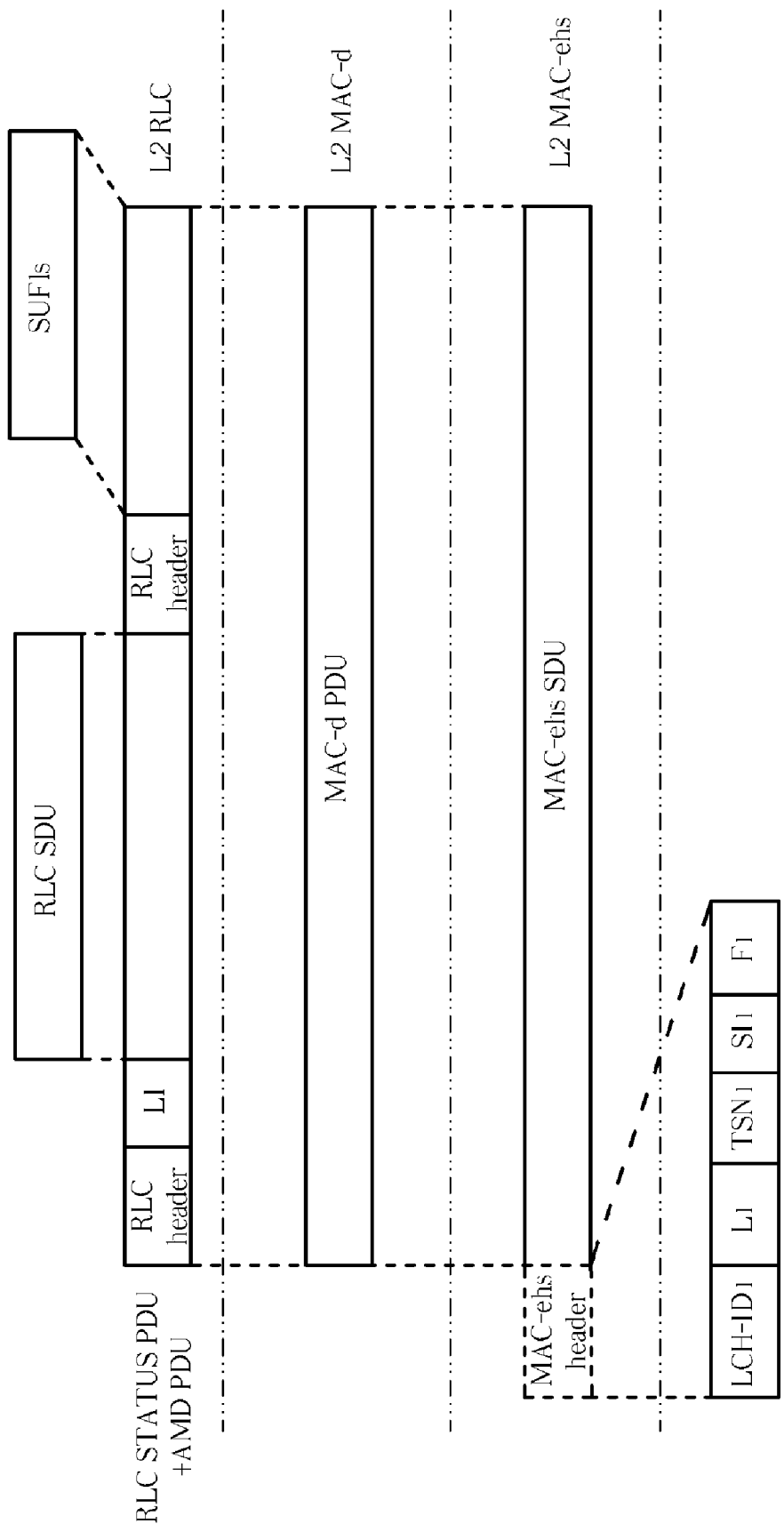
FIG. 7 to FIG. 10 illustrate schematic diagrams of transmission of an RLC AMD PDU and an RLC STATUS PDU according to embodiments of the present invention.

For example, when forming the concatenated RLC PDU, the receiver can add a Length Indicator (LI) field in the concatenated RLC PDU for indicating a position of the STATUS PDU. Please refer to FIG. 7, which illustrates a schematic diagram of transmission of an RLC AMD PDU and an RLC STATUS PDU according to an embodiment of the present invention. As shown in FIG. 7, the RLC layer of the receiver adds an extra LI in the concatenated RLC PDU, which is different from the LIs in the headers of the RLC AMD PDU and the RLC STATUS PDU, to indicate the position of the RLC STATUS PDU in the concatenated RLC PDU. Therefore, comparing to the prior art shown in FIG. 2, the embodiment shown in FIG. 7 can reduce overhead of MAC-ehs header.

Figure 8:
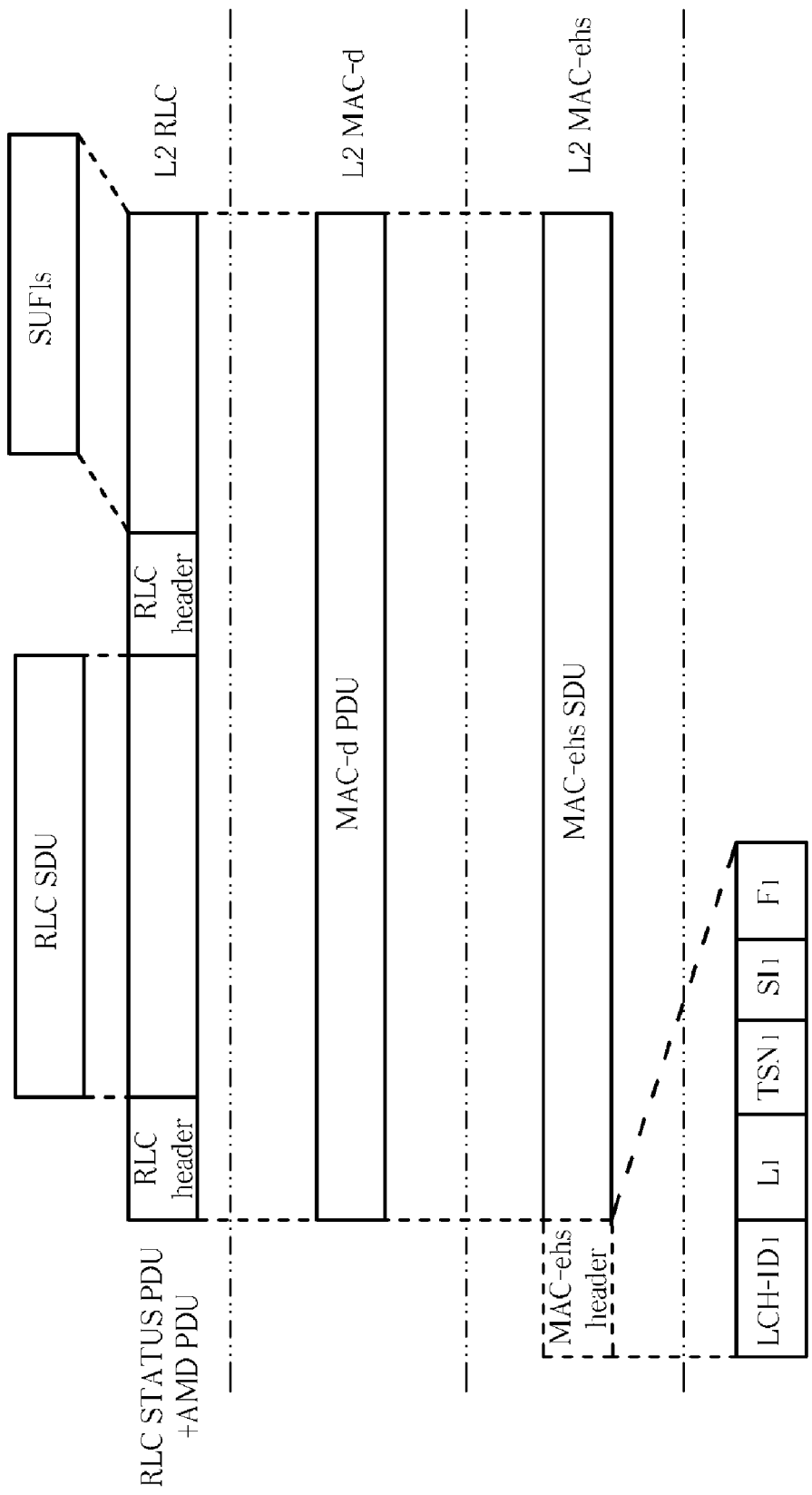

Moreover, the LI used for indicating the position of the RLC STATUS PDU shown in FIG. 7 can be removed as shown in FIG. 8. In such case, the transmitter can determine the position of the RLC STATUS PDU according to the L field ($L_1$ in FIG. 8) in the MAC-ehs header and the LI field (not shown in FIG. 8) indicating the end of the RLC SDU (Service Data Unit) in the RLC AMD PDU. Therefore, the embodiment shown in FIG. 8 can further reduce overhead.

Figure 9:
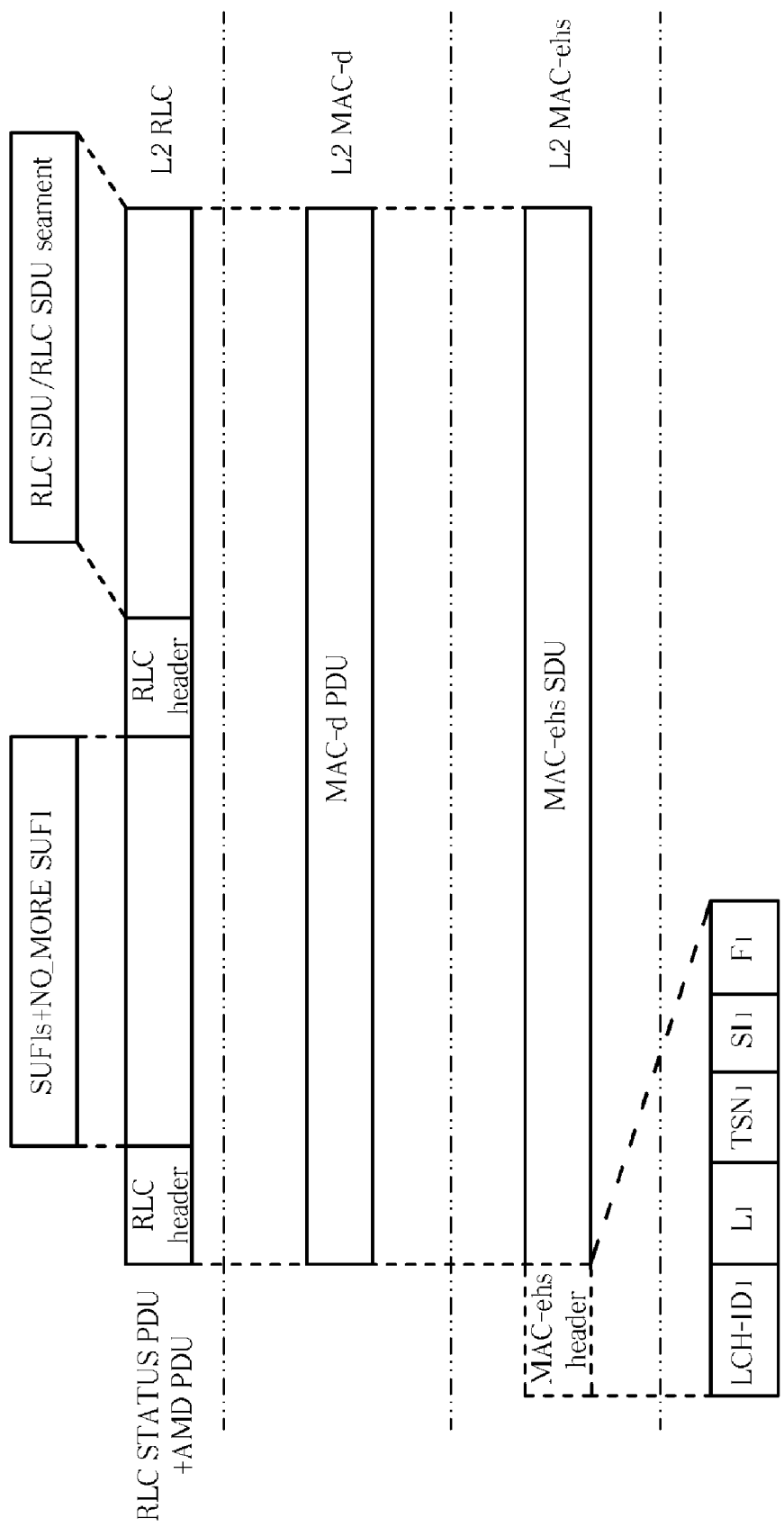

In addition, if the RLC STATUS PDU comprises a SUFI (Super Field) for indicating the end of the RLC STATUS PDU, such as NO_MORE SUFI or ACK SUFI, the length of the RLC STATUS PDU can be determined by lengths of SUFIs and NO_MORE SUFI or ACK SUFI in the RLC STATUS PDU. Therefore, the receiver does not need to add any extra LI indicating the position of the RLC STATUS PDU as shown in FIG. 9. In such case, the transmitter can determine the position of the RLC AMD PDU by the L field ($L_1$ in FIG. 9) in the MAC-ehs header and the length of the RLC STATUS PDU, which is determined by the lengths of SUFIs and NO_MORE SUFI or ACK SUFI.

Figure 10:
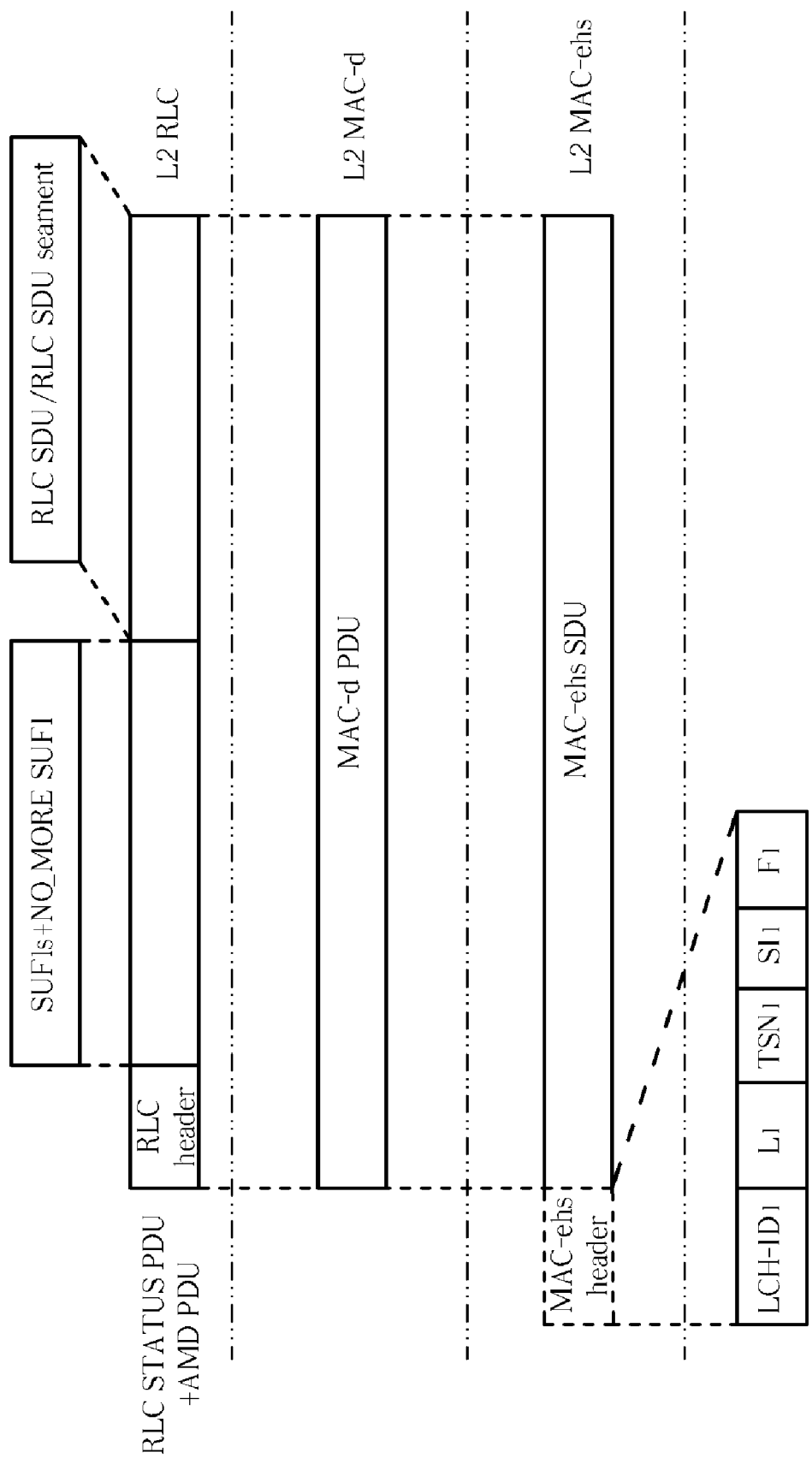

Furthermore, since the position of the RLC AMD PDU data is determined by the L field ($L_1$ in FIG. 9) in the MAC-ehs header and the lengths of SUFIs and NO_MORE SUFI or ACK SUFI, the RLC STATUS PDU header can be removed as shown in FIG. 10. In this case, a specific field with a value (e.g. the reserved value in Header Extension Type) needs to be defined in RLC AMD PDU header to indicate SUFIs exist in this RLC AMD PDU. Therefore, overhead can be further reduced.

In summary, the present invention can perform the status report procedure in the receiver and the transmitter when flexible PDU size is configured, so as to reduce overhead of MAC-ehs header.

Those skilled in the art will readily observe that numerous modifications and alterations of the device and method may be made while retaining the teachings of the invention.

What is claimed is:

1. A method for performing a status report procedure in a receiver of a wireless communication system comprising:
   forming a STATUS Protocol Data Unit (STATUS PDU) in a Radio Link Control (RLC) layer;
   forming a Data PDU with a flexible size when a mode of flexible RLC PDU size is configured;
   combining the Data PDU with the STATUS PDU for forming a concatenated RLC PDU for a Medium Access Control (MAC) layer;
   forming a MAC PDU for carrying the concatenated RLC PDU; and
   transmitting the MAC PDU to a peer transmitter.

2. The method of claim 1, wherein combining the Data PDU with the STATUS PDU for forming the concatenated RLC PDU for the MAC layer further comprises adding a Length Indicator (LI) field in the concatenated RLC PDU for indicating a position of the STATUS PDU.

3. The method of claim 1, wherein the STATUS PDU comprises a SUFI (Super Field) for indicating the end of the STATUS PDU.

4. The method of claim 3, wherein the SUFI is a NO_MORE SUFI or an ACK SUFI.

5. The method of claim 3, wherein combining the Data PDU with the STATUS PDU for forming the concatenated RLC PDU for the MAC layer further comprises removing a header of the STATUS PDU.

6. The method of claim 5, further comprising defining a specific field with a reserved value in the Data PDU header to indicate the SUFI exists in the STATUS PDU.

7. The method of claim 1, wherein forming the MAC PDU for carrying the concatenated RLC PDU comprises forming a header for indicating parameters of the concatenated RLC PDU.

8. A communication device of a wireless communication system utilized for performing a status report procedure comprising:
   a control circuit for realizing functions of the communication device;
   a processor installed in the control circuit for executing a program code to operate the control circuit; and
   a memory coupled to the processor for storing the program code;
   wherein the program code comprises:
       forming a STATUS Protocol Data Unit (STATUS PDU) in a Radio Link Control (RLC) layer;
       forming a Data PDU with a flexible size when a mode of flexible RLC PDU size is configured;

combining the Data PDU with the STATUS PDU for forming a concatenated RLC PDU for a Medium Access Control (MAC) layer;

forming a MAC PDU for carrying the concatenated RLC PDU; and transmitting the MAC PDU to a peer transmitter.

9. The communication device of claim 8, wherein in the program code, combining the Data PDU with the STATUS PDU for forming the concatenated RLC PDU for the MAC layer further comprises adding a Length Indicator (LI) field in the concatenated RLC PDU for indicating a position of the STATUS PDU.

10. The communication device of claim 8, wherein the STATUS PDU comprises a SUFI (Super Field) for indicating the end of the STATUS PDU.

11. The communication device of claim 10, wherein the SUFI is a NO_MORE SUFI or an ACK SUFI.

12. The communication device of claim 10, wherein in the program code, combining the Data PDU with the STATUS PDU for forming the concatenated RLC PDU for the MAC layer further comprises removing a header of the STATUS PDU.

13. The communication device of claim 12, wherein the program code further comprises defining a specific field with a reserved value in the Data PDU header to indicate the SUFI exists in the STATUS PDU.

14. The communication device of claim 8, wherein in the program code, forming the MAC PDU for carrying the concatenated RLC PDU comprises forming a header for indicating parameters of the concatenated RLC PDU.

15. A method for performing a status report procedure in a transmitter of a wireless communication system comprising:
receiving a Medium Access Control Protocol Data Unit (MAC PDU) carrying a concatenated RLC (Radio Link Control) PDU formed by a STATUS PDU and a Data PDU with a flexible size from a receiver, which has configured a mode of flexible RLC PDU size;
extracting the STATUS PDU and the Data PDU; and
determining a status of the receiver according to the STATUS PDU.

16. The method of claim 15, wherein extracting the STATUS PDU and the Data PDU from the MAC PDU comprises:
determining lengths and/or positions of the STATUS PDU and the Data PDU in the concatenated RLC PDU; and
extracting the STATUS PDU and the Data PDU according to the lengths and/or positions of the STATUS PDU and the Data PDU in the concatenated RLC PDU.

17. The method of claim 16, wherein determining the lengths and/or positions of the STATUS PDU and the Data PDU is performed according to a Length Indicator (LI) field indicating a position of the STATUS PDU in the concatenated RLC PDU.

18. The method of claim 16, wherein determining the lengths and/or positions of the STATUS PDU and the Data PDU is performed according to a Length (L) field indicating a length of the concatenated RLC PDU in a header of the MAC PDU.

19. The method of claim 16, wherein determining the lengths and/or positions of the STATUS PDU and the Data PDU is performed according to a Length (L) field indicating a length of the concatenated RLC PDU in a header of the MAC PDU and a SUFI (Super Field) indicating the end of the STATUS PDU in the STATUS PDU.

20. The method of claim 19, wherein the SUFI is a NO_MORE SUFI or an ACK SUFI.

21. A communication device of a wireless communication system utilized for performing a status report procedure comprising:
a control circuit for realizing functions of the communication device;
a processor installed in the control circuit for executing a program code to operate the control circuit; and
a memory coupled to the processor for storing the program code;
wherein the program code comprises:
receiving a Medium Access Control Protocol Data Unit (MAC PDU) carrying a concatenated RLC (Radio Link Control) PDU formed by a STATUS PDU and a Data PDU with a flexible size from a receiver, which has configured a mode of flexible RLC PDU size;
extracting the STATUS PDU and the Data PDU; and
determining a status of the receiver according to the STATUS PDU.

22. The communication device of claim 21, wherein extracting the STATUS PDU and the Data PDU from the MAC PDU comprises:
determining lengths and/or positions of the STATUS PDU and the Data PDU in the concatenated RLC PDU; and
extracting the STATUS PDU and the Data PDU according to the lengths and/or positions of the STATUS PDU and the Data PDU in the concatenated RLC PDU.

23. The communication device of claim 22, wherein determining the lengths and/or positions of the STATUS PDU and the Data PDU is performed according to a Length Indicator (LI) field indicating a position of the STATUS PDU in the concatenated RLC PDU.

24. The communication device of claim 22, wherein determining the lengths and/or positions of the STATUS PDU and the Data PDU is performed according to a Length (L) field indicating a length of the concatenated RLC PDU in a header of the MAC PDU.

25. The communication device of claim 22, wherein determining the lengths and/or positions of the STATUS PDU and the Data PDU is performed according to a Length (L) field indicating a length of the concatenated RLC PDU in a header of the MAC PDU and a SUFI (Super Field) indicating the end of the STATUS PDU in the STATUS PDU.

26. The communication device of claim 25, wherein the SUFI is a NO_MORE SUFI or an ACK SUFI.

* * * * *